United States Patent [19]

Smith

[11] 4,211,995
[45] Jul. 8, 1980

[54] ALARM AND LOCKING DEVICE TO PREVENT THEFT OF AN ARTICLE

[76] Inventor: Jack Smith, 209 W. Alexander, Apt. A, Euless, Tex. 76039

[21] Appl. No.: 724,649

[22] Filed: Sep. 20, 1976

[51] Int. Cl.² .................. G08B 21/00; B60R 11/02
[52] U.S. Cl. .......................... 340/63; 70/DIG. 49; 340/571; 455/345; 455/348
[58] Field of Search .............. 340/63, 280, 276, 64, 340/65, 541, 571, 546, 568; 70/58, DIG. 49; 325/312, 117, 353; 312/7 R

[56] References Cited

U.S. PATENT DOCUMENTS

| | | | |
|---|---|---|---|
| 1,206,011 | 11/1916 | Mahla | 340/65 |
| 1,223,060 | 4/1917 | Louthan | 340/280 |
| 1,747,194 | 2/1930 | Thomas | 340/280 |
| 2,627,065 | 1/1953 | Poulson | 340/280 |
| 3,625,031 | 12/1971 | Alley | 70/58 |
| 3,742,480 | 6/1973 | Hoecker | 340/280 |
| 3,781,861 | 12/1973 | Adler et al. | 340/280 |
| 3,815,117 | 6/1974 | Gopperton | 340/280 |
| 4,035,765 | 7/1977 | Wenner | 340/63 |

Primary Examiner—John W. Caldwell, Sr.
Assistant Examiner—James J. Groody
Attorney, Agent, or Firm—William L. Martin, Jr.; W. Thomas Timmons; Robert W. Turner

[57] ABSTRACT

A self contained alarm device is disclosed for aiding in the prevention of the theft of articles from an automobile, such as a citizens band radio, by sounding an audible alarm in the event of an attempted theft. The device includes a box or container in which the article to be protected is mounted and at least one switch mounted on the outside of the container for articles, and at least one switch between the container for the articles and the lid for the container so that removing the container from the surface on which it is mounted will cause an audible alarm to be sounded. One embodiment of the device also includes an electrically conducting wire forming a loop outside of the container for encircling an element of the automobile such as the steering column so that if the loop is cut, the audible alarm will also be sounded.

3 Claims, 5 Drawing Figures

ALARM AND LOCKING DEVICE TO PREVENT THEFT OF AN ARTICLE

This invention relates to devices for preventing the theft of articles from automobiles and in one of its aspects to a self contained alarm device for containing an article to be protected and which sounds an audible alarm when the container is moved or opened.

Theft of articles from automobiles has been a constant problem and worry for most people for many years. Theft of articles from automobiles is quite often carried out within hearing of people not involved in the theft, but the thefts are not stopped since they are often carried out quickly without being noticed by the people nearby or because the thief can enter the car in much the same manner and appearance as someone rightfully entering the car. An audible alarm that would be sounded whenever anyone attempted to steal articles from a car would greatly reduce the probability of successful theft. Such an alarm would notify other people in the area that an entry into the car was taking place and that such entry was not rightful. If nothing else, a passerby would be more likely to note the description of the person entering the car and in which direction that person left the scene. Additionally, the increased risk would become apparent to anyone trying to carry out a theft so that the attempted theft would more likely be aborted.

The recent popularization of certain expensive electronic gear for automobiles, such as tape players and citizen band radios, has greatly increased the likelihood of quick and profitable theft from automobiles. As a result, a number of devices has been developed for preventing theft of portable articles from automobiles such as that shown in U.S. Pat. No. 3,625,031 by G. M. Alley, III. That particular device utilizes a flexible elongated cable which is locked to the container for the article and encircles the steering column, for preventing theft of the article. If a thief has a cable cutter however, the apparatus would not prevent the theft of the article. However, because the thief has also become more clever, conventional prior art alarm systems have not always been successful in preventing theft. The present invention is directed to a self contained anti-theft device which is relatively inexpensive, easy to install, and highly "fool-proof". Also, unlike many prior art systems which require the car to be wired with special door switches, and thus are costly and time consumming to install, the present device is fully self-contained and requires no modification of the automobile, and may be readily moved from car to car. Also, since it is self-contained the thief, once he leaves the automobile with his booty, is carrying a box that is sounding a loud audible alarm that he can't turn off. Thus, the chances are he will leave the desired article behind when he flees the scene.

In accordance with the preferred embodiment, this invention comprises a container for an article to be protected, a lid mounted on the container, an electric alarm circuit including at least one switch mounted on the outside of the lid so that each switch is in a position causing the electric circuit to be open except when the container is mounted against a surface, and a means for generating an alarm signal when the electric alarm circuit is open. Preferably, the anti-theft device also includes in the electric alarm circuit at least one switch mounted on the container so that each such switch is in a position to cause the electric alarm circuit to also be open except when the lid is in place on the container. A preferred embodiment of the anti-theft device also includes an electrically conducting wire forming a loop outside of the container, which can be electrically in series with the electric alarm circuit, for encircling the element of the automobile such as the steering column so that if the loop is cut by someone attempting to remove protected articles, the alarm signal will be sounded. In the preferred embodiment, the means for generating an alarm signal includes a switch would closes when there is an opening in any circuit that includes one of the mechanically switchable switches or the wire loop, and one or more batteries within the container for the article in series with the electrically switchable switch, so that the means for generating an alarm cannot be disabled by disconnecting the battery from outside of the container for the articles.

These and other objects, advantages and features of this invention will be apparent from the following description taken with reference to the accompanying drawings, wherein is shown the preferred embodiments of the invention;

Figure 1:
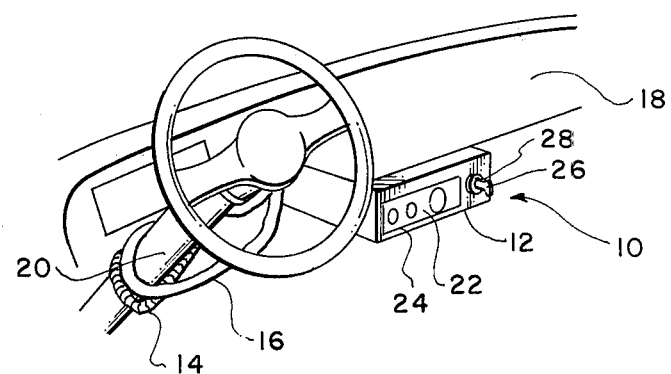
FIG. 1 is a pictorial representation of an anti-theft device according to this invention mounted underneath the dash of an automobile.
Figure 2:
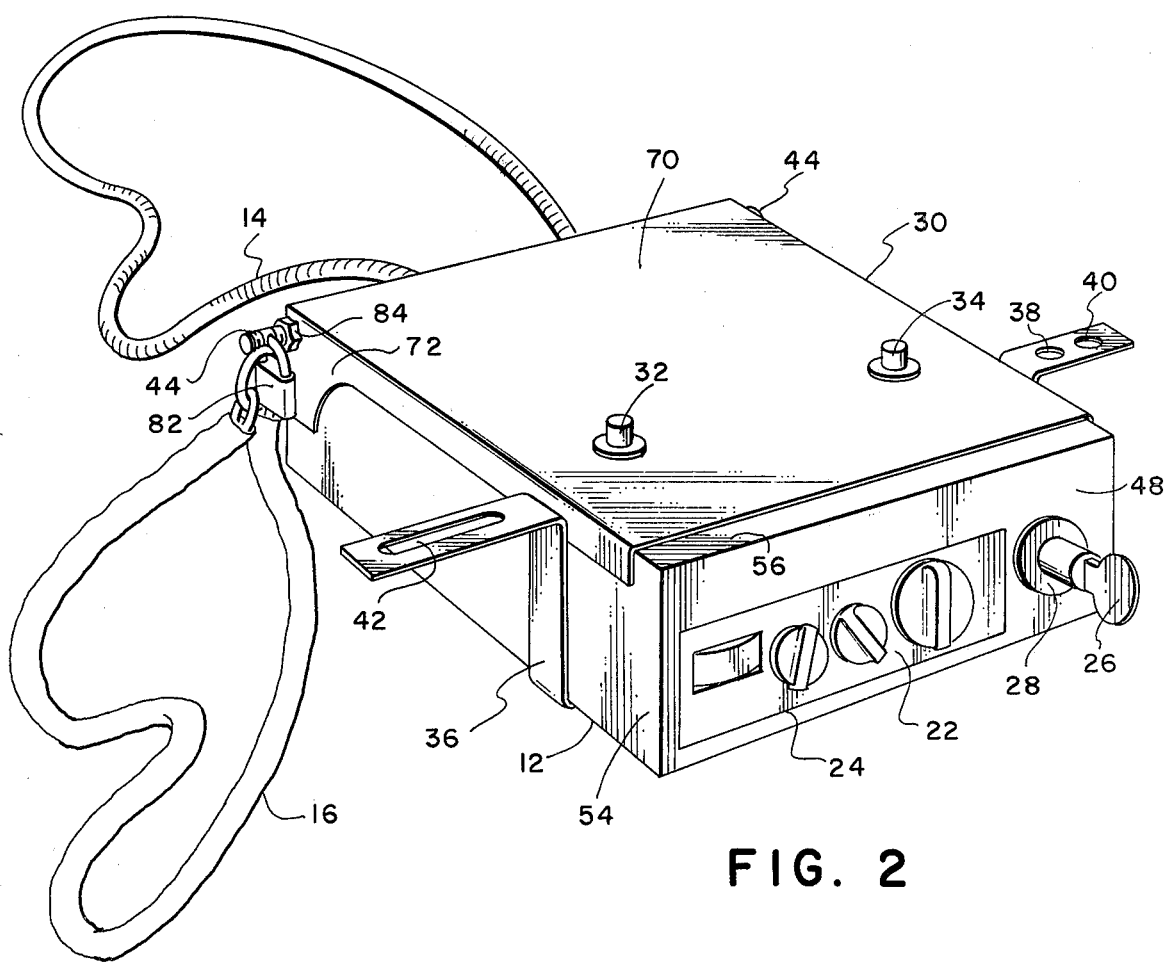
FIG. 2 is a perspective view of an anti-theft device according to this invention.
Figure 3:
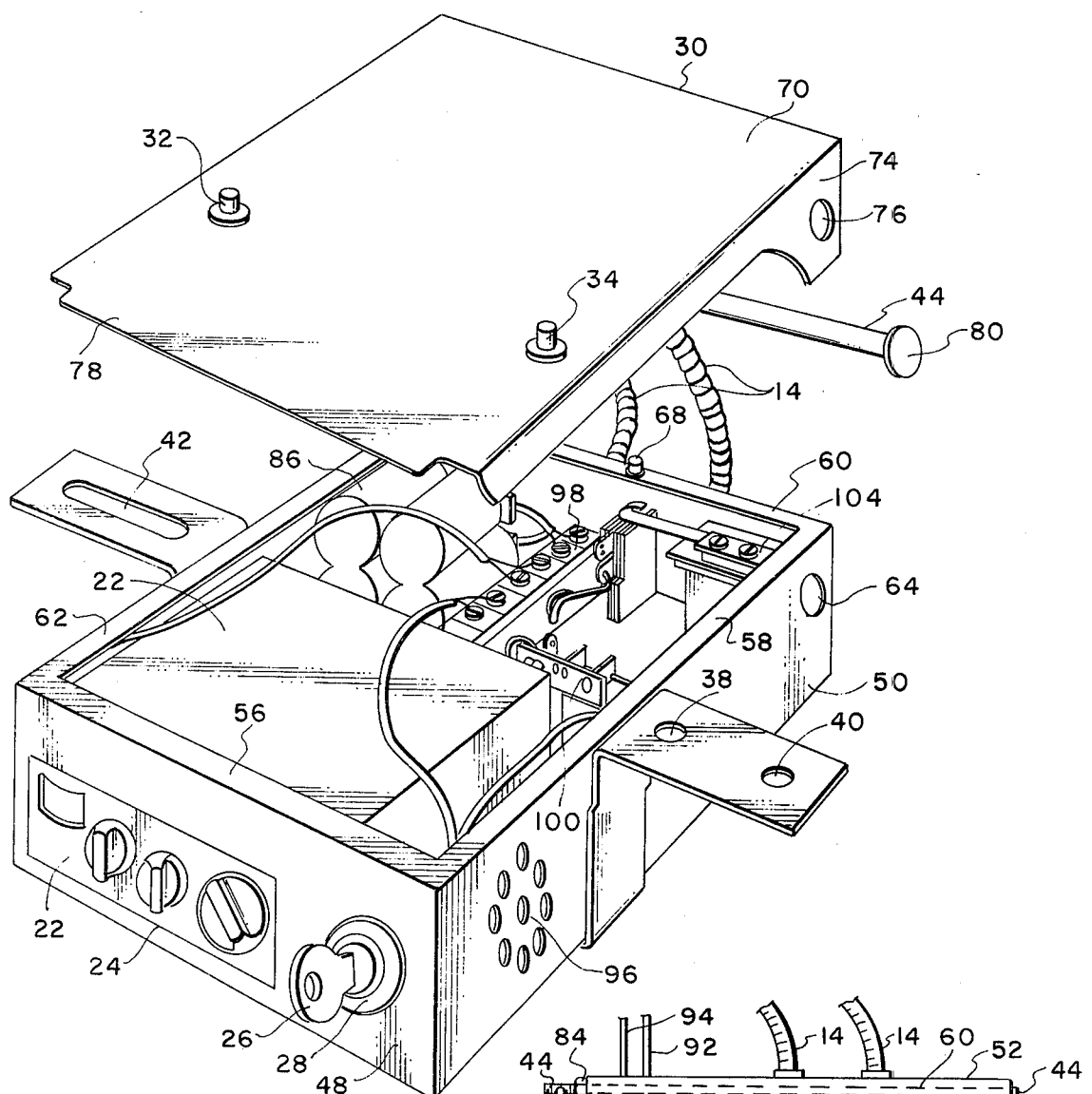
FIG. 3 is a perspective view of an anti-theft device employing this invention with the lid removed from the container for the protected articles.

Referring now to the drawings, an anti-theft device of the present invention is generally designated by the reference numeral 10 and comprises a container 12, an electrically conducting wire loop 14 and a metal chain 16 coated with plastic, as shown in FIG. 1. Anti-theft device 10 is mounted underneath dash 18, and wire loop 14 and chain 16 encircle steering column 20. An article to be protected from theft 22 is exposed through an opening 24 so that knobs and meters on the article can be accessed by a user but that the article itself cannot be removed from container 12. A switch 28 is mounted in container 12 and can be operated by a key 26 for disabling the alarm system. A lid 30 is mounted on container 12 as illustrated in FIG. 2. Two pressure sensitive mechanically switchable switches 32 and 34 are mounted on the outside of lid 30 so that each such switch is in an open position except when the container is mounted against a surface such as the dash of an automobile. Switches 32 and 34 can be spring loaded normally open switches, or light sensitive normally open switches or any other suitable switches. A mounting bracket 36 fits underneath container 12 so that the bracket can be used to secure the container to the dash. Mounting holes 38, 40 and 42 receive the bolts or screws for securing bracket 36 to the dash. When mounting bracket 36 is secured to the dash of an automobile by screws or bolts through mounting holes 38, 40 and 42, mechanically switchable electric switches 32 and 34 are held against the dash in the depressed position which is the electrically closed position for these switches so that the switches can carry current when container 12 and lid 30 are in the normal mounted position.

Figure 4:
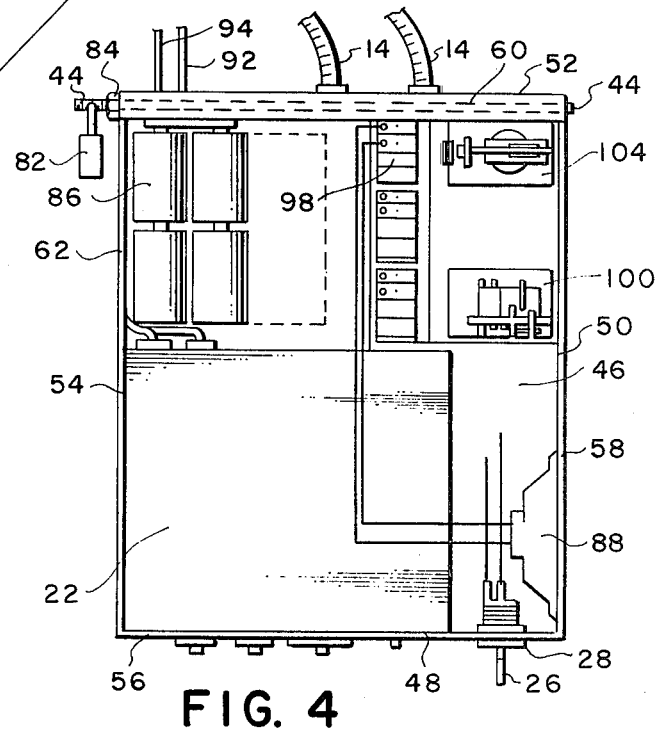
FIG. 4 is a top view of the anti-theft device of the present invention.

Container 12 forms an open box-like structure comprising a bottom 46, as can be seen in FIG. 4, and four upstanding walls 48, 50, 52 and 54 attached to bottom 46, and flanges 56, 58, 60 and 62 which extend inwardly from the substantially upstanding walls. Wall 50 includes an aperture 64 for receiving rod 44 and wall 54 contains an aperture 66 (not shown) for receiving rod 44. Mounted on flange 60 is a mechanically switchable electric switch 68 which is depressed in the electrically closed position when lid 30 is mounted in place on container 12.

Lid 30 comprises a substantially flat surface 70 with downwardly turned flanges 72 and 74. Flange 74 includes an aperture 76 for receiving rod 44 and flange 72 includes a similar aperture 77 for receiving rod 44. When lid 30 is mounted in place on container 12, aperture 64 aligns with aperture 76 and aperture 66 aligns with aperture 77 so that rod 44 can be slipped into place through all four apertures, thus securing lid 30 to container 12 at one end. The other end of lid 30 is secured to container 12 by sliding L-shaped flange 78 of lid 30 underneath flange 56 of container 12. Rod 44 is secured at one end by knob 80 and at the other end by padlock 82. Padlock 82 also secures the two ends of chain 16. The padlocked end of rod 44 can also be threaded for receiving nut 84 for making a tighter fit between rod 44 and lid 30.

The anti-theft device of this invention further comprises a means within the container for the article for generating an alarm signal when any circuit including at least one of the mechanically switchable electric switches is open which includes battery pack 86, made of one or more batteries within container 12 and a means for generating an audible signal 88, electrically in series with battery pack 86, key operated switch 28, and an electrically switchable electric switch which in this embodiment is a latching relay 104, electrically in series with battery pack 86 and means for generating an audible signal 88 so that when relay 104 is closed, means for generating an alarm signal 88 generates an audible alarm signal. Since relay 104 is a latching relay, it can be opened again only by breaking the series circuit that it is in, such as by opening switch 28.

Mechanically switchable electric switches 32, 34, and 68 along with wire loop 14 are wired in series with a relay 100 and the car power source so that a conducting path is formed to carry current to keep relay 100 closed except when one of the mechanically switchable electric switches is open or loop 14 has been cut, or the electric current to the coil of the relay is somehow disabled. Relay 100 is wired to close relay 104 when it closes so that whenever there is a break in the series circuit containing switches 32, 34 and 68 and wire loop 14, latching relay 104 closes, sounding the audible alarm. Thus, when lid 30 is mounted in place on container 12 and container 12 is secured to the dash by bracket 36, and wire loop 14 is secured around the steering column, no alarm should be sounded, but when any of these situations is changed, an audible alarm is sounded.

Figure 5:
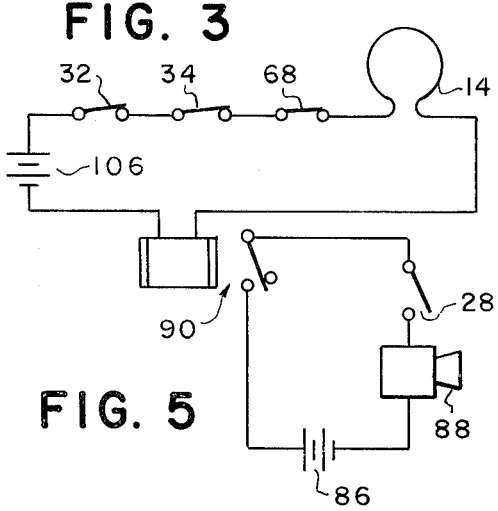
FIG. 5 is a schematic diagram of one form of the circuit of this invention.

An alternative embodiment of the alarm circuit is shown in FIG. 5. In this embodiment, the combination of latching relay 104 and relay 100 is replaced by a relay 90 which is open in non-alarm situations. As long as switches 32, 34 and 68 are closed and loop 14 is not broken, current is carried to the coil of relay 90 keeping the contacts of the relay open. If a break occurs in the circuit containing the switches and loop 14, relay 90 closes sounding the audible alarm. A power source 106, which can be the car battery or can be battery pack 86, supplies current to the series circuit containing the switches and loop 14. Since relay 90 is not a latching relay, an alarm signal can be stopped by simply curing the problem that initiated the alarm. Thus, if someone were attempting to remove the anti-theft device, and opened switches 32 and 34 in the process, he could shut off the alarm of this embodiment by once again closing switches 32 and 34 as long as the car battery connection has not been broken. The alarm would again sound if the car battery connection was broken, making it impossible to take the anti-theft device without sounding the alarm. An alternative way of turning off the alarm would be to open normally closed switch 28 by using key 26. Switches 32, 34, 68 and 28 are shown as open in FIG. 5, but in normal operating conditions, these swtiches would be closed. Switches 32, 34 and 68 along with loop 14 are in series in the preferred embodiments, but can be wired in any way so that when there is an opening in the circuit containing any of these elements, relay 90 or latching relay 104 closes and sounds the audible alarm. The advantage of using the car battery for power source 106 is that it saves the internal battery pack 86 for alarm situations rather than draining it for the continual current of the series switch circuit.

One embodiment of the present invention includes an additional relay, also activated by the series switch circuit, in series with the car battery and the car horn so that an opening in any of these switches 32, 34 or 68 or the wire loop 14 will cause the automobile horn to sound. This feature would be in addition to the audible alarm features internal to the anti-theft device. Another embodiment would include the car lights in series with the car horn and car battery so that the lights would come on and the car horn would sound when any of these switches opened or wire loop 14 was cut.

A preferred embodiment of the anti-theft device of this invention further includes a means for accessing the power source of the automobile such as wires 92 and 94 attached to the car battery. The power from car battery can thus be used to supply power to the article to be protected from theft as well as the mechanically switchable electric switches and wire loop 14 so that these items do not drain power from battery pack 86.

Wall 50 of container 12 also includes an array of apertures 96 immediately adjacent to the means for generating an alarm signal 88 so that an audible alarm can be more clearly heard from outside the container.

Wire loop 14 has been illustrated as a separate loop from chain 16, but loop 14 could be intertwined between the links of chain 16 so that it would be hidden from view and less accessible.

A very important advantage inherent in the device just disclosed is that no matter how a thief might attempt to dismantle or remove the article to be protected or the container for the article, he will set off an audible alarm. If he lowers container 12 with lid 30 in place by removing bracket 36, then switches 32 and 34 will open, setting off the alarm. If the thief attempts to simply lower container 12, while holding lid 30 against the dash, then he will set off the audible alarm by opening switch 68. In either case, he will not be able to make a quick getaway after setting off the alarm since loop 14 would still be in place around the steering column even if the thief had cut chain 16. If a thief cuts wire 14 and chain 16 before attempting to remove container 30, he would set off the audible alarm even before starting the removal of container 30.

It will be understood that the invention is not limited to the embodiments disclosed but is capable of rearrangement, modification and substitution of parts and elements without departing from the spirit of the invention.

From the foregoing, it will be seen that this invention is one well adapted to attain all of the ends and objects herein above set forth, together with other advantages which are obvious and which are inherent in the apparatus.

It will be understood that certain features and subcombinations are of utility and may be employed without reference to other features and subcombinations. This is comtemplated by and is within the scope of the claims.

The invention having been described, what is claimed is:

1. A method for preventing the theft of a portable article to be protected from beneath an automobile dashboard comprising, in combination:
   placing the portable article to be protected in a container;
   mounting a lid on the container;
   positioning the lid under the dashboard of the automobile;
   looping an electrically conducting wire from the container around an element of the automobile;
   so that an alarm signal is generated whenever any of the following occur:
   (a) the lid is brought forth from under the dashboard;
   (b) the container is removed from the lid; and
   (c) there is a break in the wire loop.

2. The method as defined by claim 1 wherein said step of placing the portable article to be protected with a container comprises:
   making a container having a bottom, four upstanding walls and an open top;
   cutting an opening in one of the upstanding walls;
   placing an alarm signal generating device inside of the container; and
   putting a radio into the interior of the container so that control knobs on the radio are accessible through the opening in one of the upstanding walls.

3. The method as defined by claim 1, which further comprises the step of sandwiching a normally open light sensitive switch between the lid and the dashboard of the automobile.

* * * * *